No. 842,457. PATENTED JAN. 29, 1907.
S. B. HARDING.
AERIAL FERRY.
APPLICATION FILED JULY 12, 1906.
5 SHEETS—SHEET 3.
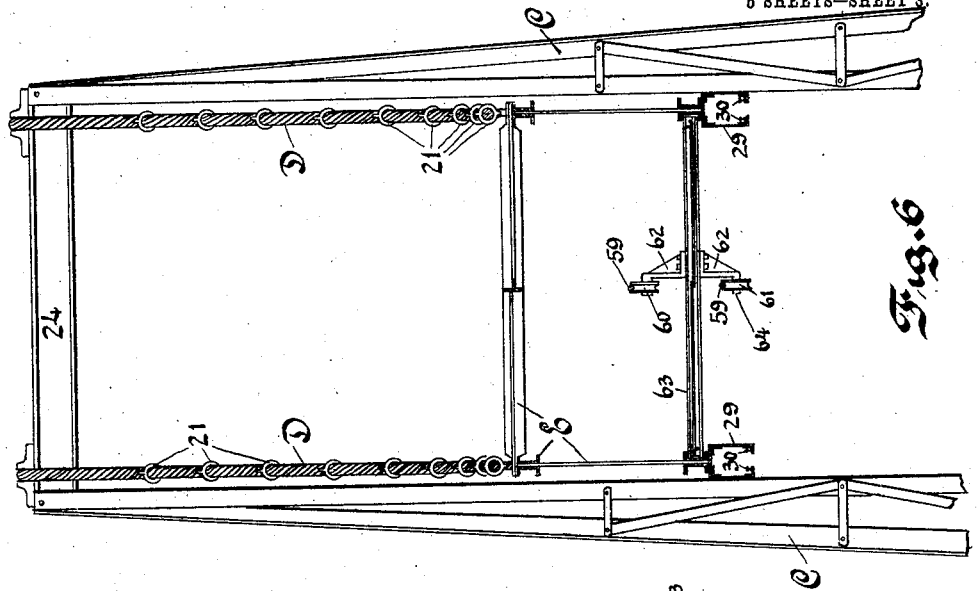
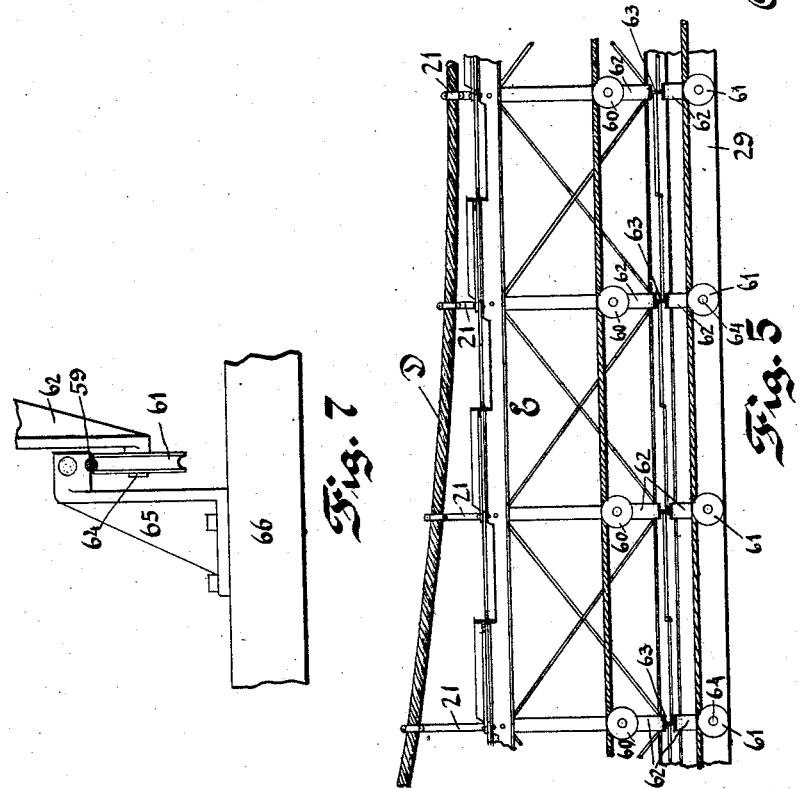
Witnesses
Thos. Platzer
Gertrude H. Boink
Samuel B. Harding, Inventor
By
Attorney No. 842,457. PATENTED JAN. 29, 1907.
S. B. HARDING.
AERIAL FERRY.
APPLICATION FILED JULY 12, 1906.
5 SHEETS—SHEET 4.
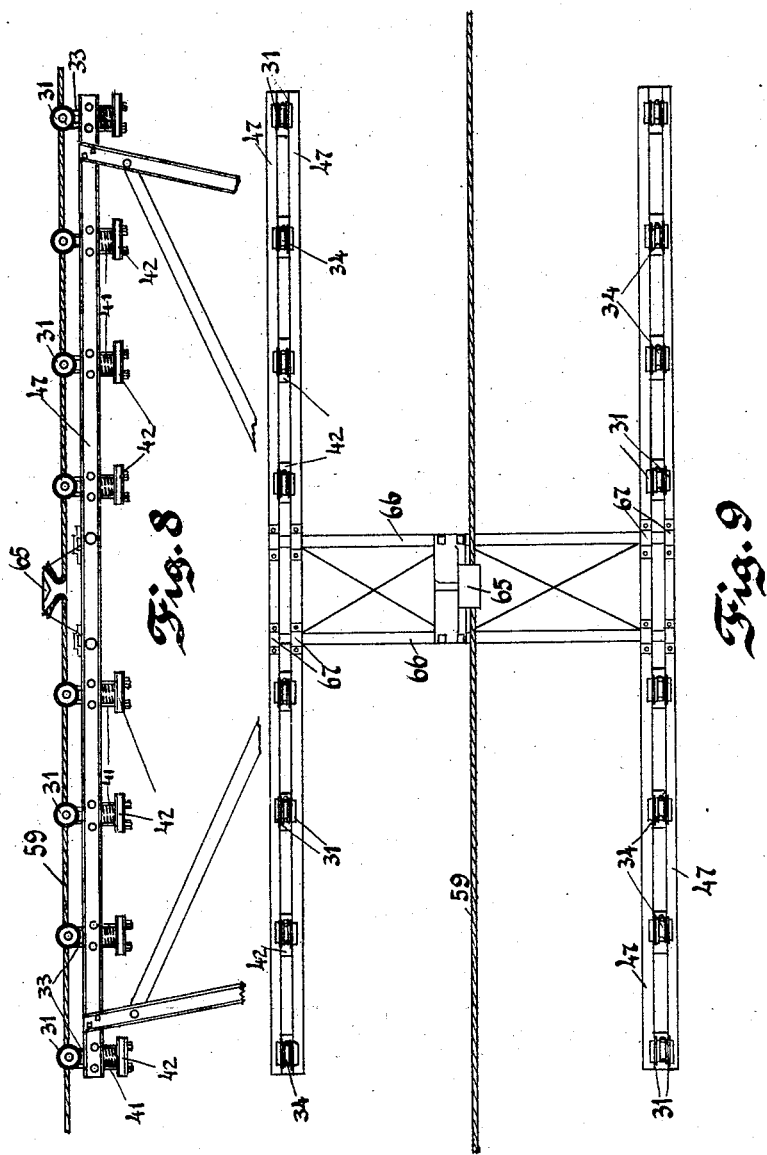

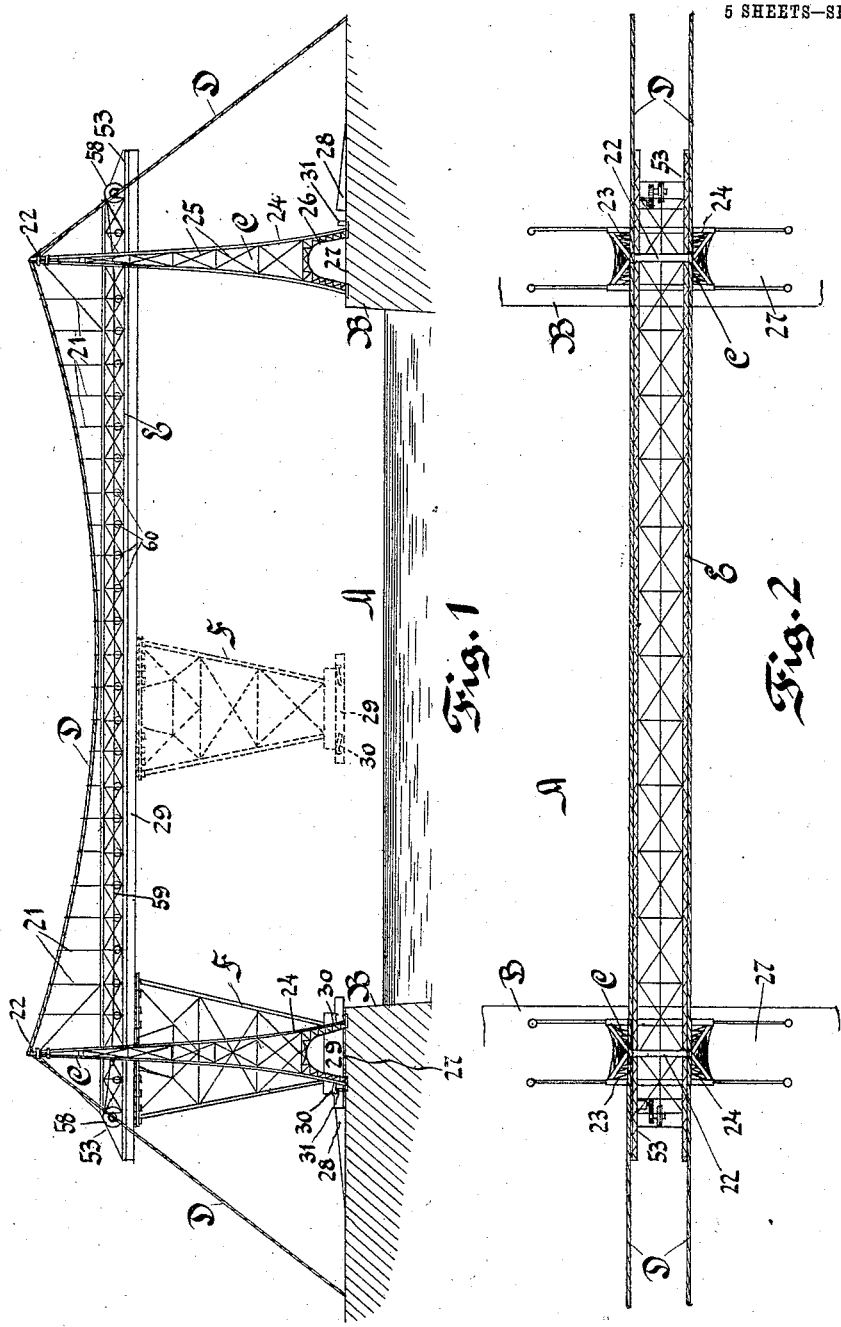

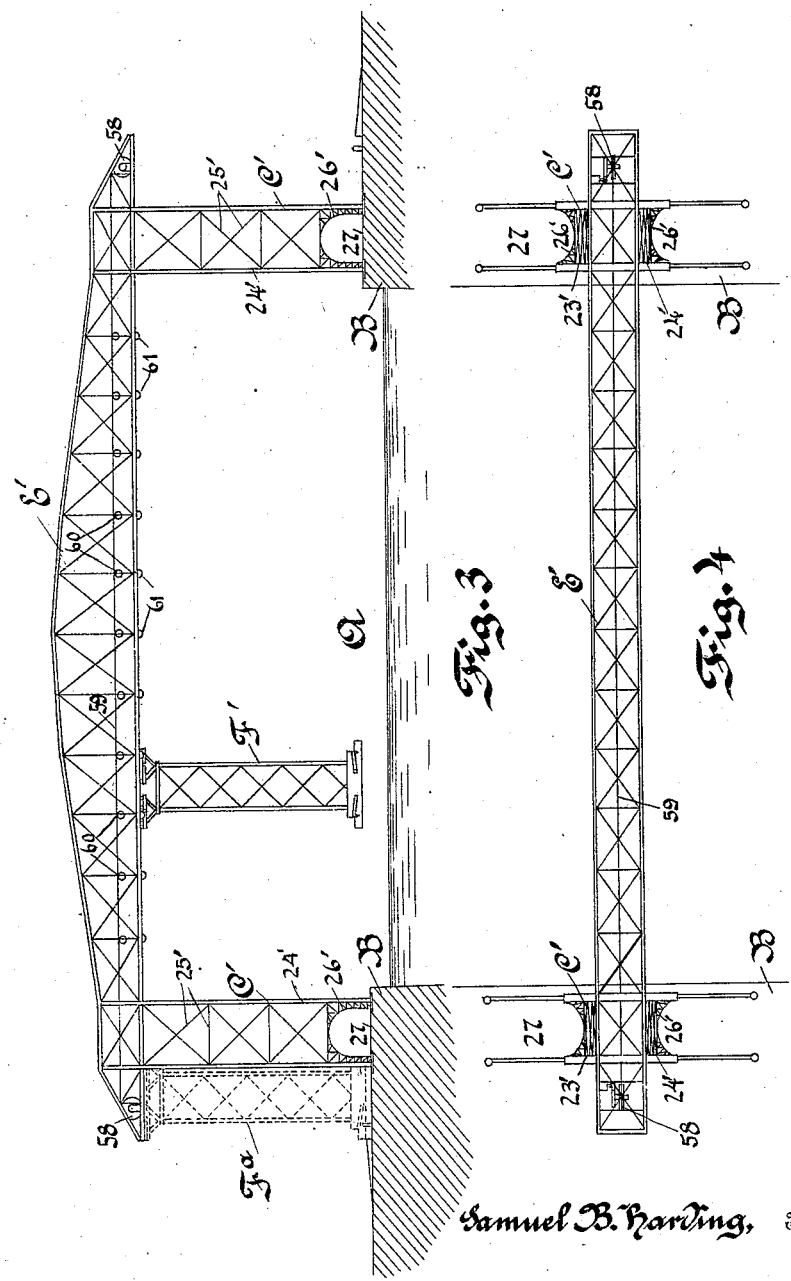

No. 842,457. PATENTED JAN. 29, 1907.
S. B. HARDING.
AERIAL FERRY.
APPLICATION FILED JULY 12, 1906.
5 SHEETS—SHEET 5.
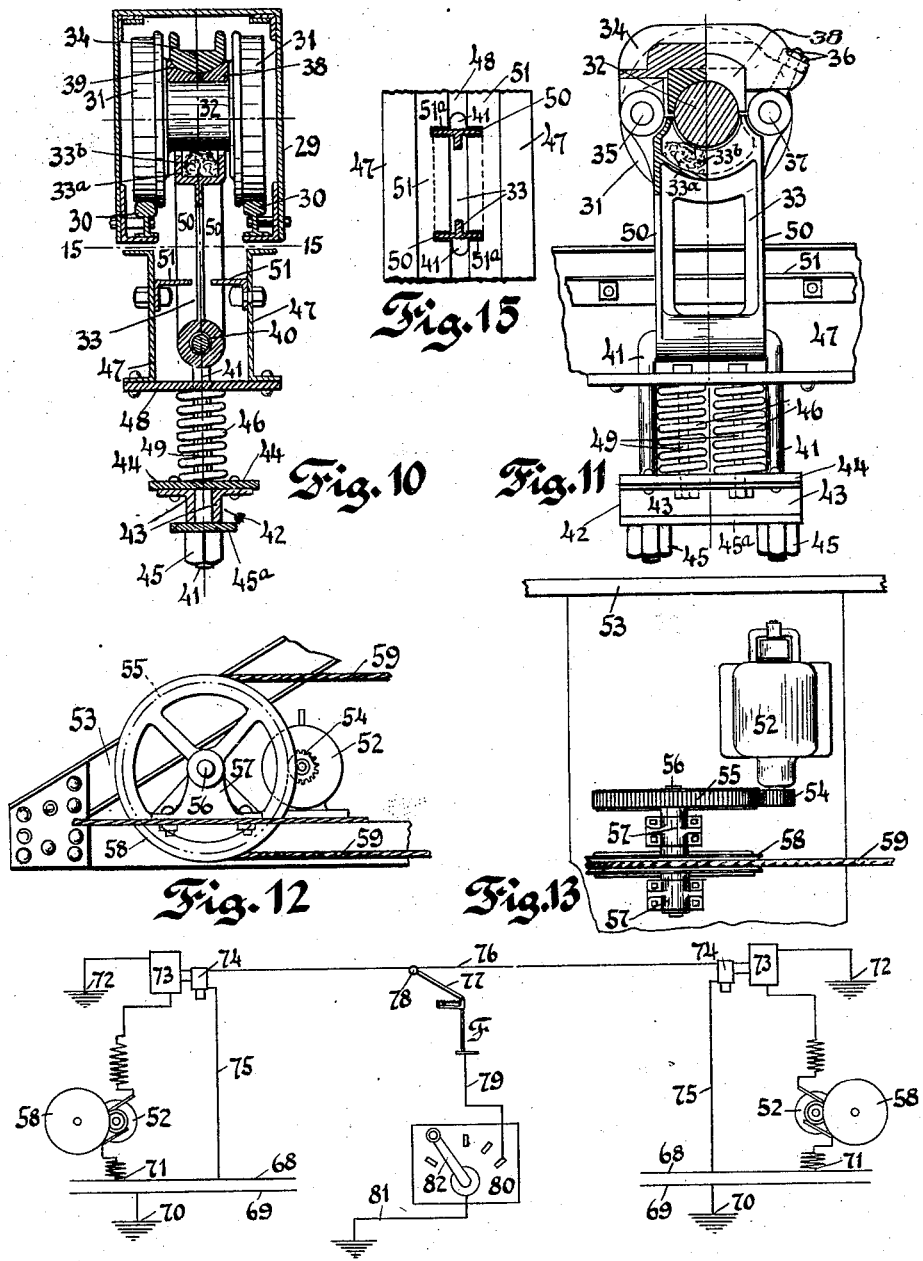

of the highway. On the tops of piers 23 and 24 rests and may be fastened a casting 28, which supports cross-framing 22 and also has two bearing-surfaces at an inclination corresponding to that of the cable D, said surfaces supporting cable-saddles 29, which are preferably segmental, as shown, and are of such breadth as to support the entire cable, consisting of a plurality of wire ropes.

UNITED STATES PATENT OFFICE.

SAMUEL B. HARDING, OF WAUKESHA, WISCONSIN.

AERIAL FERRY.

No. 842,457.

Specification of Letters Patent.

Patented Jan. 29, 1907.

Application filed July 12, 1906. Serial No. 325,815.

*To all whom it may concern:*

Be it known that I, SAMUEL B. HARDING, of Waukesha, Wisconsin, have invented an Aerial Ferry, of which the following is a specification.

This invention relates to that class of devices which is used to span streams, inlets, and other locations where, owing to various conditions, a bridge, in the proper sense of the word, is not possible or desirable—as, for example, in locations where the requirements of navigation forbid a bridge under a certain height, while, on the other hand, the nature of the banks on either side thereof make a lofty bridge unapproachable, and thus impracticable. In such cases there may be a raised structure spanning the stream or inlet and a suspended car traveling thereon and having a passenger-floor at such a level that it is easily boarded from the banks. Heretofore structures of this sort have been devised, which, however, were imperfect and offered disadvantages in their realization, which imperfections and disadvantages it is the object of my present invention to overcome in whole or in part.

More specifically, my invention has for its object, first, to reduce the weight of the suspended car and render it more easily run;
second, to improve the design of the wheels and track on which the car runs; third, to dispose the loading and unloading position of the car and the form of the towers in such manner that riparian traffic may not be obstructed; fourth, to improve the traction devices, rendering them as simple and effective as possible, and in general to improve the design by such constructions and combinations as will be hereinafter more specifically cited.

My improved structure may best be understood from a consideration of the following specification, reference being had to the accompanying drawings, wherein—

Figure 1 is a side elevation of one form of a complete ferry according to my invention, this form being more particularly adapted to a long span. Fig. 2 is a plan view thereof. Fig. 3 is a side elevation of another form of my complete ferry, this form being intended and more particularly adapted for shorter spans. Fig. 4 is a plan view thereof. Fig. 5 is a longitudinal section, on an enlarged scale, through a portion of the main span in the first form to illustrate the cable-carrying device. Fig. 6 is a transverse section through the same. Fig. 7 is an end view, on an enlarged scale, of the cable-attachment piece on the car. Fig. 8 is a side view, on an enlarged scale, of the upper part of the car. Fig. 9 is a plan view of the same. Fig. 10 is a transverse vertical section through the axes of a pair of car-supporting wheels, showing the wheels, track, hanger, and accessory parts. Fig. 11 is a side elevation thereof, partly in section. Figs. 12 and 13 are respectively a side and plan view of the cable-driving mechanism. Fig. 14 is a diagrammatical view showing one possible arangement for communicating power to the driving-motors from the car. Fig. 15 is a plan section on the plane 15 of Fig. 10.

In these figures every reference-numeral refers always to the same part.

In Fig. 1 is shown a gulf A, which may be a river, estuary, inlet, strait, or other like body of water across which the ferry is erected, the same having on its banks suitable foundations B therefor. On each foundation B is erected a tower or pier C, and these towers or piers are spanned by suspension-cables D, which in turn support a stiffening-truss E by means of suspenders 21. The stiffening-truss E carries a tramway or track from which is suspended the car F, which runs back and forth between the two banks. Each tower C is composed of two piers 23 and 24, which form a bent open in the center and connected at the top by cross-framing 22, over which the cables D pass. The truss E passes through the tower-bents, as shown, projecting beyond at each side, and the latter are entirely open below, so as to give a passage-way for the car F, which also passes through the tower-bents. The piers 23 and 24 are braced by lattice-work 25 and at their bases are provided with trussed archways 26 to enable highways 27, running along the bank or sea-wall of the gulf A, to pass through the towers. The object in causing the driveways or promenade 27 to pass through the towers is to enable the latter to be placed close to the edge of the gulf A, thus making the span as short as possible, with the corresponding saving in material, while at the same time not interfering with the straight course of the driveway and avoiding the necessity of a detour around the tower, which has been necessary in the constructions heretofore provided. Adjacent to the car when at its end positions are inclined approaches 28, whereby the platform 29 thereof is made accessible to teams and passengers, and there are or may be provided hooked catches 30, which engage with posts 31 or other detainers adapted to hold the car against motion until ready to start.

The other form of ferry shown in Figs. 3 and 4 comprises towers C', each composed of two piers 23' and 24', like the piers 23 and 24, braced by lattice-work 25' and provided with trussed archways 26' at their bases; but these towers support directly on their upper ends the spanning truss E', which carries the track from which is suspended the ferry-car F'. This form being for shorter spans, no suspension-cable is necessary. I have in this form shown an arrangement of car somewhat different from that of Figs. 1 and 2. The latter has its sides spread laterally to prevent swaying motion, and its limiting position is such that it lies across the highway at the end of its travel. The car F' of Fig. 3, on the other hand, passes completely through the towers at either end, occupying the position shown at F$^a$, and thus does not obstruct travel on the highway while it may be in this position. The latter form is preferable in so far as it clears the highway in its stopping position; but this is not essential to the principle of my invention, while to make the form of car shown in Fig. 1 clear the highway would necessitate too great an extension of the truss beyond the tower for most commercial purposes, and it is very desirable of have a wide base of support of the car to prevent longitudinal swaying during acceleration or retardation of its movement.

Some of the main features of my invention are embodied in the supporting means for the car, the track and rollers therefor being shown more specifically in Figs. 10 and 11. The truss E or E' carries a pair of box-girders 29, open at the bottom and carrying the rails 30 interiorly thereof on either side of the bottom opening. On these rails travel the wheels 31, which are mounted in pairs connected together by the short axle or journal 32, on which is mounted the hanger 33.

One of the principal difficulties in the suspended car as heretofore constructed has been the difficulty in permitting the wheels to adjust themselves to irregularities in the track or in the spacing between the girders 29 on the opposite sides without undue strain on any part or in readily permitting slight lateral vibrations of the car, and my construction is destined to overcome these difficulties. To this end the upper part of the hanger 33 consists of a yoke 34, which is hinged upon a pin 35 to the lower part and connected at its other end thereto by a hinge-bolt 36, pivoted on a pin 37. This yoke does not rest directly on the journal 32 of the shaft, but rests upon a brass 38, whose lower surface fits the journal and whose upper surface is longitudinally concaved, as shown at 39, and the lower surface of the yoke 34 is longitudinally convexed to fit therein. This permits the lateral oscillation of the hanger 33 without disturbing the distribution of weight upon the respective rails 30 or causing any bending strain on the axle or hanger. Below the journal 32 the hanger is provided with an oil-cup 33$^a$, which contains a lubricating-pad 33$^b$. The hanger 33 has at its lower end a longitudinal hole 40, through which passes the middle bar of a stirrup-bolt 41, whose lower ends pass through a member 42, composed of two angle-plates 43 and a sole-plate 44, having holes through which the legs of the bolt 41 pass, the member 42 being supported in position by nuts 45 and washer-plates 45$^a$ on the ends of the bolts 41. On the sole-plate 44 rest a pair of helical springs 46, which are under compression by the weight of the car, whose upper frame consists of a pair of longitudinal channels 47, resting upon a sole-plate 48, which rests on the upper ends of the springs 46, and the sole-plates 42 and 48 are connected to secure the springs 46 in compressed relation by bolts 49 to limit the upward yield of the car. The channel-beams 47 passing along the entire length of the wheel-base (see Figs. 8 and 9) and being separated in each case from the wheels 31 by springs compressed to a predetermined extent, the weight will at all times be evenly distributed in spite of any variations in the height of the track. This enables the same purpose to be accomplished as heretofore without expensive equalizing arrangements, and without sacrifice of rigidity. It will be observed, moreover, that the double hinge comprising the two oscillating joints 39 and 40 between the wheels and car permits of any slight lateral adjustments between the individual wheels. There is another fault of the ordinary constructions which I provide against in my improved construction—namely, the maintaining of the wheels in substantially rigid relation to the car-frame as regards longitudinal movement, while they are at the same time free to move laterally and vertically. The traction force being applied to the frame of the car, irregularities in the track—as, for example, what would be caused by the expansion of the aperture between the ends of two rails—produce a retarding force on the wheels and bring a longitudinal bending couple upon the hangers from which the car-frame is suspended. To avoid any longitudinal oscillation due to this couple, my hanger 33 is provided at its sides with vertical ribs or flanges 50, and the channel-beams 47 have secured to their inner sides angle-irons 51, which project beyond the ribs 50 and are slotted out to receive them, as indicated at 51ª in Fig. 5. Any longitudinal bending couple upon the hanger 33 produced by the traction upon the beams 47 and resistance upon the track 30 is now overcome by the counter-couple acting between the angles 51 and ribs 50 of the hanger above and the sole-plate 48 on the bolt 41 at the edges of the holes through which the latter passes, thus holding the hanger 33 rigidly upright.

Instead of mounting the actuating-motor upon the car itself, as has been heretofore done, I prefer to actuate the car from a stationary motor, or preferably from two stationary motors 52, located at the opposite ends of the truss E or E' and on the overhanging portions 53 thereof. Each motor is arranged with a pinion 54 on the shaft thereof, meshing with a spur-gear 55, mounted on a shaft 56, journaled in pillow-blocks 57 and carrying a cable-sheave 58. Over the two sheaves run an endless cable 59, which is supported, preferably at intervals along the truss, by a series of idle sheaves 60 on its upper lap and a second series 61 on its lower lap, these sheaves being supported on frames 62, which are secured to transverse beams 63 of the truss E or E', the upper sheaves 60 being preferably above the beam 63 and the lower sheaves 61 below said beam and turning on stub-shafts 64, which are supported from one end only, as shown. The cable 59 is connected at one point thereof to a clutch or fastening device 65 of any description, which is supported in the center of a horizontal rectangular frame 66, which is connected at its ends to the longitudinal channel-beams 47 of the car-frame, preferably in such manner as to allow one or both ends of the frame 66 to slide transversely on the beams—as, for example, by means of straps 67.

The mode of control of the electric motors 52 is preferably that illustrated diagrammatically by Fig. 14, which is as follows: 68 69 show the two conductors from a generating-station or belonging to any electrical system, and between which the requisite potential for driving the motors is produced. One of these conductors—namely, the conductor 69—is grounded, as shown at 70, upon the truss-frame, so as to be in electrical connection therewith. One pole 71 of each motor 52 is connected to the conductor 68, and the other pole 72 grounded through a rheostat or other controlling mechanism 73. An auxiliary motor 74 is connected mechanically with the rheostat 73, so as to operate the same to open and close the circuit of the motor 52 and regulate the movements thereof, and this motor 74 has one pole 75 thereof connected to the conductor 68 and the other pole connected to a trolley-wire 76, which runs along the center of the truss parallel with the cable 59. The car F carries a trolley-pole 77, whose roller 78 presses against the trolley-wire 76 and thereby forms an electrical connection between it and the conductor 79, which leads from the trolley-pole to a rheostat or other controlling mechanism 80, and thence to the ground by a lead 81, it being supposed that this lead is grounded upon the frame of the car so as, in conjunction with the ground 70, to be in electrical connection with the pole 69 of the circuit. The operator on the car moves the handle 82 of the rheostat 80 in such manner as to admit current to the two auxiliary motors 74 (one at each end of the truss) and actuate them to close the circuits of their respective motors 52, so that they revolve the sheaves 58 and thus drive the cable 59 and car F across the ferry. It will be understood that I prefer to use two motors 52 in order not only to divide the strain upon the cable 59 and prevent excessive friction, but also to avoid danger of complete stoppage by a possible breakdown of one of said motors. I do not, however, confine myself to the use of two motors nor to the use of a single trolley-wire, because those skilled in the art will readily understand that in place of the single conductor and grounded frame (illustrated in Fig. 14) I might employ a complete insulated circuit in conjunction with a double trolley; nor do I limit myself to the particular means of control of the two motors shown, since other means might be provided—as, for example, the motion of the car might be controlled from a stationary point, thus avoiding the use of a trolley, and other modifications of the device will readily suggest themselves to those skilled in the art—nor is it necessary that all the improved features of my invention be embodied therein; but such changes or omissions may be made as lie within the spirit and scope of my invention as set forth by my claims.

Having thus described my invention, what I claim as new, and desire to secure by Letters Patent, is—

1. In combination with a highway along one side of a gulf, an aerial ferry across said gulf comprising a supporting-tower spanning said highway and permitting passage thereon, said tower having also a clear opening transverse to said highway, a bridge spanning said gulf and supported on said tower, and a car suspended from said bridge and adapted to pass through the opening in said tower.

2. In combination with a pair of highways along the margins of a gulf, towers or piers erected over the highways and arranged to clear said highways to permit unobstructed traffic thereon, said piers having each a clear opening transverse to said highways, a bridge supported on said piers or towers and spanning the gulf, and a car suspended from said bridge and arranged to pass through said openings, whereby said towers or piers do not obstruct either the movements of said car or the traffic on said highways.

3. An aerial ferry comprising a pair of supporting-towers, a truss-span supported thereon and having a runway, a suspended car rolling on said runway, and highways under said towers transverse to said runway; said towers having each a longitudinal opening therethrough permitting said car to pass through said towers, and a transverse opening over said highway to permit unobstructed traffic thereon.

4. An aerial ferry comprising a tower or pier, a bridge-span supported at one end on said tower or pier and having an overhang beyond the latter, a suspended car carried by said bridge-span and adapted to run through said tower upon said overhang, and a highway running transversely under said tower, the latter having a clear opening to permit traffic on said highway.

5. An aerial ferry comprising towers or piers each having a longitudinal opening, a truss spanning said towers and having an overhang at each end thereof and extending beyond said towers or piers, a runway carried by said truss from end to end thereof, and a suspended car running on said runway and having a wheel-base part or all of which extends through the openings in said towers or piers at the ends of its travel.

6. An aerial ferry comprising a tower or pier having a longitudinal opening in the center, a suspension-cable mounted on one end of said tower or pier, means for supporting said suspension-cable at the other end thereof, a stiffening-truss supported by said cable and passing through and beyond said opening, a runway carried by said stiffening-truss, and a car running on said runway and entering the opening of said towers or piers at the end of its travel, a part of said car passing completely through and beyond said opening.

7. In an aerial ferry or tramway, suspension means permitting lateral oscillation comprising a pair of wheels carrying a journal, a bearing-block resting on said journal, a hanger pivoted to swing transversely from said bearing-block, and a pivotal connection between said hanger and the frame of said car.

8. In an aerial ferry or tramway, suspension means permitting lateral oscillation comprising a pair of wheels carrying a journal, a bearing-block resting on said journal, a hanger pivoted to swing transversely from said bearing-block, and a longitudinal hinge-joint connecting the lower end of said hanger to the car-frame.

9. In an aerial ferry or tramway, suspension means permitting lateral oscillation comprising a pair of wheels carrying a journal, a bearing-block resting on said journal, a hanger pivoted to swing transversely from said bearing-block, a stirrup-bolt having its center bar longitudinally pivoted on said hanger, and means for supporting the car-frame from said stirrup-bolt.

10. In an aerial ferry or tramway, suspension means permitting lateral oscillation comprising a pair of wheels carrying a journal, a bearing-block resting on said journal, a hanger pivoted to swing transversely from said bearing-block, a stirrup-bolt having its center bar longitudinally pivoted on said hanger, springs supported by said stirrup-bolt, and a car-frame resting on said springs.

11. In an aerial ferry or tramway, suspension means permitting lateral oscillation comprising a pair of wheels carrying a journal, a bearing-block resting on said journal, a hanger pivoted to swing transversely from said bearing-block, a stirrup-bolt having its center bar longitudinally pivoted on said hanger, a member connecting the ends of said stirrup-bolt and secured thereto, springs resting on said member, and a car-frame having a sole-plate resting upon said springs.

12. In an aerial ferry or tramway, in combination with a car-frame comprising in part longitudinal beams or sills, a plurality of wheels, a plurality of hangers supported by said wheels, and a plurality of springs supported by said hangers and supporting said longitudinal beams, whereby the weight resting on the respective wheels is substantially equalized.

13. In an aerial tramway, the combination of a pair of parallel longitudinal sill-beams comprising a part of a car-frame, a plurality of wheels, a plurality of hangers supported by said wheels and depending therefrom, and a plurality of springs supported by said hangers and supporting in turn said sill-beams.

14. In combination with a pair of longitudinal sill-beams forming a part of a car-frame, one or more pairs of wheels connected by journals, one or more hangers suspended from said journals and mounted to oscillate longitudinally with respect thereto, said hangers depending between said sill-beams, yokes pivoted to the lower ends of the respective hangers on a longitudinal axis and depending below said sill-beams, springs supported by said yokes, and means for transferring the weight of said sill-beams to said springs.

15. In combination with a pair of longitudinal sill-beams forming a part of a car-frame, one or more pairs of wheels connected by journals, one or more hangers suspended from said journals and mounted to oscillate longitudinally with respect thereto, said hangers depending between said sill-beams, yokes pivoted to the lower ends of the respective hangers on a longitudinal axis and depending below said sill-beams, springs supported by said yokes, means for transferring the weight of said sill-beams to said springs, and abutment-pieces carried by said sill-beams for the end faces of said hangers to overcome bending tendencies caused by rolling friction of said wheels upon said track and maintain said hangers rigidly upright.

16. In an aerial ferry or tramway, the combination of a pair of parallel tracks, a suspended car, rollers running on said tracks, and suspension-joints between said rollers and said car permitting the rollers severally a limited amount of lateral parallel translational motion with respect to the car.

17. In an aerial ferry or tramway, the combination of a pair of double tracks, each track composed of two parallel rails, hangers each carrying a pair of rollers running on the respective rails of each track, a suspended car, and a connection between said car and hangers permitting a limited amount of lateral motion to the several rollers without oscillating them, whereby to take up lateral irregularities in the gage of the track.

18. In an aerial ferry or tramway, the combination of a pair of double tracks, each track composed of two parallel rails, a plurality of pairs of rollers running on the respective rails of each track, a suspended car, and flexible connections between the car and said pairs of rollers permitting a limited amount of lateral translational motion to the several pairs of rollers independently of one another while maintaining an equal pressure of the opposite wheels of each pair upon the track.

19. In a ferry or tramway, the combination of a pair of double tracks, each track composed of two parallel rails, two pairs of rollers running on the respective rails of each track, a suspended car, and a connection having a double longitudinal hinge between each pair of rollers and the car, whereby the car may have a lateral translational movement relative to either or both pairs of wheels without altering the distribution of pressure on the several rails.

20. In an aerial ferry or tramway, the combination of a pair of double tracks each track composed of two parallel rails, a plurality of pairs of rollers running on the respective tracks, a suspended car, and independent connections between each pair of wheels and the car, each of said connections comprising a member pivoted at its opposite ends on longitudinal axes to the car and the pair of wheels respectively.

21. In an aerial ferry or tramway, the combination of a track, a car suspended therefrom and rolling thereon, a pair of driving-sheaves at opposite ends of said track, an endless cable running over said sheaves, a cable-attachment piece on said car secured to said cable at one point thereof, and a pair of motors at opposite ends of said track adapted to rotate the respective driving-sheaves.

22. In an aerial ferry or tramway, the combination of a track, a car suspended therefrom and rolling thereon, a pair of driving-sheaves at opposite ends of said track, an endless cable running over said sheaves, a cable-attachment piece on said car secured to said cable at one point thereof, a motor adapted to rotate one of said driving-sheaves so as to move said car along said track, and a mechanism on said car for controlling said motor.

23. An aerial ferry or tramway comprising a raised track, a car suspended from and rolling on said track, a cable to which said car is attached, sheaves at each end of said track operating said cable, an electric motor operating one of said sheaves, a controlling mechanism for said motor, an auxiliary motor adapted to operate said controlling mechanism, and a second controlling mechanism on said car electrically connected with said auxiliary motor and adapted to control its movements.

24. An aerial ferry or tramway comprising a raised track, a pair of driving-sheaves at opposite ends thereof, an endless cable passing around said sheaves and driven thereby, a suspended car rolling on said track and connected to said cable at one point thereof, a pair of electric motors driving the respective sheaves, and a controlling mechanism on said car adapted to operate said motors.

25. An aerial ferry or tramway comprising a raised track, a pair of driving-sheaves at opposite ends thereof, an endless cable passing around said sheaves and driven thereby, a suspended car rolling on said track and connected to said cable at one point thereof, a pair of electric motors driving the respective sheaves, a controlling mechanism in circuit with each motor and adapted to control the movements thereof, auxiliary motors connected with the respective controlling mechanisms, and a central controlling mechanism on said car adapted to control the movements of both of the said auxiliary motors and thereby those of the main motors and of said car, substantially as described.

26. An aerial ferry comprising a pair of raised towers, each consisting of a pair of piers separated in the center and the two piers connected together at the top of said opening to form a bent leaving a clear opening through the center, a bridge-truss supported by said towers and overhanging the latter on each end, a track running from end to end of said truss, a suspended car mounted on said track and arranged to pass through the openings in said towers and beyond said towers at the ends of its travel, a pair of driving-sheaves rotating in vertical planes at the opposite ends of said truss, a motor actuating one of said driving-sheaves, a plurality of roller-sheaves supporting each lap of said cable, an attachment-piece mounted on said car and overhanging the lower row of roller-sheaves and connected to said cable, and means on said car for electrically controlling the movements of said motor.

In testimony whereof I have hereunto set my hand this 6th day of July, 1906.

S. B. HARDING.

In presence of—
WALTER D. MACKLEITH,
GEORGE W. COLLES.